United States Patent Office 3,316,901
Patented May 2, 1967

3,316,901
PLASTER OF PARIS BANDAGE
David F. Smith, 120 Grove St., Bay Head, N.J. 08744
No Drawing. Filed May 17, 1965, Ser. No. 456,488
10 Claims. (Cl. 128—91)

This application is a continuation-in-part of my co-pending application, Ser. No. 239,060, filed Nov. 20, 1962 and now abandoned.

In making the so-called plaster of Paris bandages for orthopedic use or of other plaster of Paris products, materials are included to shorten the time required to set the plaster when it is wet in water preparatory to making a cast; since plaster as made by heat or steam calcining of gypsum is relatively slow to set, requiring from 15 to 30 minutes, whereas the products mentioned are required to set in about 2 to 8 minutes. Such plaster set-accelerators usually comprise potassium sulfate and/or finely divided "active" gypsum or set plaster known as terra alba.

In making the so-called hard-coated plaster of Paris bandages (or other bonded or compact plaster of Paris products) one may make a slurry of powdered plaster in an aqueous liquid containing, among other materials, a minor amount of a material which prevents setting of the plaster during processing but which is subsequently decomposed after the slurry is formed into a desired product or coated on a flexible backing material (as when making a plaster bandage) and then dried by heating to evaporate the water, so that a final, dry product is produced which has a substantially un-delayed set. Such set-inhibitors are, for example, ammonium borate, ammonium caseinate or other volatile weak base salts of certain weakly acid materials such as protein hydrolysates with acid ionization constants between about $10^{-7}$ and $10^{-10}$. Upon heating of such aqueous solutions of such ammonium salts, hydrolysis takes place and the $NH_3$ from the hydrolysis is evaporated leaving residues of the said weakly acid materials which do not substantially delay the set of the final, dry plaster when it is wet to make a cast. However, since such set-inhibitors even in minor amounts can delay the set for many hours or even days, even traces of set-inhibitor left in the dry plaster can delay the set for several minutes and at best may cause the product to have an un-desirable variation in set from batch to batch. It is, therefore, important to consistently minimize their presence in the product.

This invention relates to methods for reducing such delay and/or variations in the set of plaster of Paris products made through the use of ammonium or other volatile, weak base salts as set-inhibitors.

I have found that zinc sulfate (by which I mean to include $ZnSO_4$, $ZnSO_4 \cdot 6H_2O$ and $ZnSO_4 \cdot 7H_2O$) is an excellent set-accelerator for plaster of Paris. Furthermore, when the said dry plaster of Paris products contain zinc sulfate and/or the hydrates of it as mentioned, the delay and/or variation in the set is much reduced. This, I assume, is due to the fact that when such products are wet in water to make a cast, any ammonium salts therein hydrolyze to produce ammonia and this ammonia combines with $Zn^{++}$ ion to form the relatively stable complex $Zn(NH_3)_4^{++}$ ion. This effect then results in continued hydrolysis of said ammonium salts with substantial reduction in the amount of ammonium salt remaining to delay the set of the plaster. Other compounds having similar effect are $CdSO_4$, $NiSO_4$, $CoSO_4$ and $CuSO_4$.

The zinc or other sulfate may be dissolved in the slurry liquid in amounts from 0.1 to 2.5% (in terms of $ZnSO_4$) of the weight of the plaster, with enough extra ammonia to form the complex ion. I have discovered that, in spite of the great stability of the ammonia complex ion in the solution, the complex ion is still decomposed to leave the simple ion in the dry product to combine with the ammonia from the ammonium salt of the borate or caseinate. Otherwise the zinc or other sulfate may be sprayed over the dry plaster product. In either case the zinc or other sulfate may be used in minor amounts down to about 0.1% of the weight of the plaster and up to 2.5% of the weight of the plaster of the usual potassium sulfate accelerator may be included to speed the set as may be required, the sum of the amounts of zinc and potassium sulfate being 0.5 to 2.5% the weight of plaster. Since normally only a small proportion of the set-inhibitor remains in the final product, minor amounts of the zinc sulfate suffice. The zinc or other sulfate may also be sprayed or coated on the dry plaster product in the form of a suspension of the powdered sulfate in a water-soluble material that itself does not affect the set of the plaster. Such materials are the polyglycols such as polyethylene glycol, polypropylene glycol and methoxy-polyethylene glycol. Such polyglycols should have molecular weights on the average from about 300 to about 4000 and melting points not above about 60° C. If the polyglycol is a solid at room temperature, the suspension may be made in the melted material and applied to the plaster product in the molten state.

The following examples illustrate my methods, but the proportions of set-inhibitor to my set-accelerators are not critical since, after drying the slurry the amounts of undecomposed set-inhibitor are normally small in any case.

Example 1

0.7 lb. of casein is stirred into 2 lbs. water. Stirring is continued while 3 lbs. of 28 wt. percent aqueous ammonia are added and the stirring continued for about 20 minutes to dissolve the casein. Then 8.5 lbs. of a 10 wt. percent solution of cooked starch are added with thorough stirring. Then 7 lbs. more of the aqueous ammonia are added and the solution made up with water to a total weight of 96.5 lbs. Then 170 lbs. of finely ground plaster of Paris (steam calcined gypsum) are stirred into the solution and finally 3.5 lbs. of finely ground $ZnSO_4 \cdot 6H_2O$ are added and the whole mix thoroughly stirred. The slurry is applied with a roll coater to 32 x 28 mesh surgical gauze at a rate to yield a dry plaster of Paris bandage weighing 46 grams per square foot. The coated gauze is then dried at 200 to 260° F. in a circulating air oven. The adequacy of drying can be judged visually by observing the absence of wet spots as the bandage emerges from the drier and is confirmed by allowing the dry bandage to stand protected from moisture for 3-4 hours and then wetting it in water and smoothing the wet bandage with the hands to assure absence of grittiness in the wet bandage before it sets. The drying should not be continued substantially beyond the point where the stored and wetted bandage shows no grittiness. The bandage so produced showed a setting-time of 3 minutes by the method of Federal Specification GG–B–101d, June 2, 1959, and otherwise met the requirements of this Federal Specification.

Example 2

1 lb. of boric acid (U.S.P.) was dissolved in 11 lbs. of 28 wt. percent aqua ammonia. 50 lbs. of water are added and then 2.2 lbs. of polyvinyl acetate homopolymer aqueous dispersion (emulsion) containing 55 wt. percent solids (du Pont Elvacet). 3 lbs. finely ground $ZnSO_4 \cdot 7H_2O$ are then dissolved in the solution and it is made up with water to a total weight of 100 lbs. Then 170 lbs. of finely ground steam calcined plaster of Paris are thoroughly stirred into the solution and the slurry is coated upon gauze as in Example 1. The slurry coated gauze was dried at 240° F. as before. The final, dry product showed a setting-time of 3½ minutes by the method of Example 1 and otherwise met the Federal Specification cited.

The casein in the slurry liquid may vary between about 0.2 and 2% by weight. The boric acid in the slurry liquid may vary between about 0.5 and 3% by weight. The proportion of slurry liquid to plaster may vary from about 50 to about 100 lbs. liquid per 100 lbs. plaster. Thus the maximum variation in casein is from 0.1 to 2% of the weight of plaster and of boric acid from 0.25 to 3% of the weight of plaster. The polyvinyl acetate bonding material may be used with either casein or boric acid in the proportion of from 0.5 to 1.5% (solids content of the emulsion) of the weight of the plaster. Other bonding agents than starch or polyvinyl acetate emulsion or mixtures of them may be used. Thus, as bonding agent there may be used cooked starch, dextrin, methyl cellulose, hydroxypropyl methyl cellulose, hydroxyethyl methyl cellulose or mixtures of these in total amounts from 0.5 to 2% of the weight of plaster of Paris. However, with boric acid (no casein present) at least 0.25% of polyvinyl acetate solids based on the plaster weight is desirable. The amount of $NH_3$ used may vary from the amount needed to form the zinc complex ammonia ion plus 0.4 of the weight of boric acid used or about 10% of the weight of casein used, up to 15% $NH_3$ based on the weight of slurry liquid.

Having thus described my invention, what I claim is:

1. A dry, settable plaster of Paris bandage comprising a flexible backing material substantially uniformly coated with a substantially uniform mixture of: (1) powdered plaster of Paris in major proportion (2) a minor proportion of a material selected from the class consisting of boric acid in amount from about 0.25 to about 3% of the weight of plaster of Paris and casein in amount from about 0.1 to about 2% of the weight of the plaster of Paris and (3) zinc sulfate in amount from about 0.1 to about 2.5% of the weight of the plaster of Paris; said material selected being in small part combined with ammonia in the form of a salt and said zinc sulfate being present in amount sufficient to significantly reduce the retarding effect of said salt.

2. The bandage of claim 1 wherein the said zinc sulfate is in the form of a dispersion in a water-soluble polyglycol.

3. The bandage of claim 1 wherein the said zinc sulfate is selected from the class consisting of $ZnSO_4 \cdot 6H_2O$, $ZnSO_4 \cdot 7H_2O$ and mixtures of same.

4. The bandage of claim 2 wherein the said zinc sulfate is selected from the class consisting of $ZnSO_4 \cdot 6H_2O$, $ZnSO_4 \cdot 7H_2O$ and mixtures of same.

5. The bandage of claim 1 wherein said substantially uniform mixture also contains a bonding material selected from the class consisting of polyvinyl acetate deposited from an emulsion in amount from about 0.5 to about 1.5% of the weight of said plaster of Paris and cooked starch, dextrin, methyl cellulose, hydroxypropyl methyl cellulose, hydroxyethyl methyl cellulose in amount from about 0.5 to about 2% of the weight of said plaster of Paris, and mixtures of said bonding materials.

6. The bandage of claim 5 wherein said substantially uniform mixture further contains an amount of potassium sulfate such as to make the sum of the amounts of zinc sulfate and potassium sulfate between about 0.5 and 2.5% of the weight of said plaster of Paris.

7. The bandage of claim 6 wherein the said zinc sulfate is in the form of a dispersion in a water-soluble polyglycol.

8. The bandage of claim 1 wherein the said substantially uniform mixture further contains potassium sulfate in an amount to make the sum of the amounts of zinc sulfate and potassium sulfate between about 0.5 and about 2.5% of the weight of said plaster of Paris, said zinc sulfate being present in amount sufficient to significantly reduce the retarding effect of the residual ammonium salt retarder remaining in the bandage after heating.

9. A plaster of Paris mix of delayed setting-time comprising 100 parts by weight of powdered plaster of Paris and 50 to 100 parts by weight of an aqueous solution containing (1) a compound selected from the class consisting of between 0.1 and 2 parts by weight of casein and between 0.25 and 3 parts by weight of boric acid (2) between 0.1 and 2.5 parts by weight of zinc sulfate (3) a material selected from the class consisting of an aqueous emulsion of polyvinyl acetate containing from 0.5 to 1.5 parts by weight of polyvinyl acetate and cooked starch, dextrin, methyl cellulose, hydroxypropyl methyl cellulose, hydroxyethyl methyl cellulose in amount from 0.5 to 2 parts by weight and mixtures of said materials (4) an amount of potassium sulfate such as to make a total of between 0.5 and 2.5 parts by weight of potassium sulfate plus zinc sulfate and (5) $NH_3$ in amount required to form the $Zn(NH_3)_4^{++}$ ion plus 0.4 of the weight of boric acid plus 10% of the weight of casein, the quantity of zinc sulfate being sufficient to significantly reduce the retarding effect of the ammonium salt remaining in the mix after subseqeunt heating.

10. The method of making a dry, settable plaster of Paris bandage which comprises substantially uniformly coating the product of claim 9 upon a flexible backing material and drying the so-coated material at a temperature of between about 200 and about 260° F. whilst the said plaster of Paris remains substantially unset.

References Cited by the Examiner

UNITED STATES PATENTS

| | | | |
|---|---|---|---|
| 1,638,001 | 8/1927 | Brookby | 106—112 |
| 1,868,372 | 7/1932 | Swift | 106—35 |
| 1,892,706 | 1/1933 | Reed | 128—91 |
| 2,401,675 | 6/1946 | Ware | 106—146 |
| 2,557,083 | 6/1951 | Eberl | 128—91 |
| 2,579,367 | 12/1951 | Curtis et al. | 106—146 |
| 2,842,170 | 8/1958 | Foglia | 128—91 |

TOBIAS E. LEVOW, *Primary Examiner.*

S. E. MOTT, *Assistant Examiner.*